United States Patent [19]
Inagaki et al.

[11] Patent Number: 5,200,849
[45] Date of Patent: Apr. 6, 1993

[54] LIGHT BEAM SCANNING SYSTEM

[75] Inventors: Yukihiko Inagaki; Yoshihiro Kishida, both of Kyoto, Japan

[73] Assignee: Dainippon Screen Mfg. Co., Ltd., Japan

[21] Appl. No.: 818,512

[22] Filed: Jan. 9, 1992

[30] Foreign Application Priority Data

Jan. 9, 1991 [JP] Japan .................................. 3-12903
Jan. 24, 1991 [JP] Japan .................................. 3-25380

[51] Int. Cl.⁵ ............................................. G02B 26/08
[52] U.S. Cl. .................................... 359/196; 359/201; 359/216; 250/201.2; 250/235; 358/496
[58] Field of Search ............... 359/196, 197, 201, 202, 359/216, 217, 218, 219, 215; 250/234, 235, 236, 201.1, 201.2, 201.4; 346/108; 358/443, 444, 474, 481

[56] References Cited

U.S. PATENT DOCUMENTS

| | | | |
|---|---|---|---|
| 4,216,378 | 8/1980 | Monette | 250/235 |
| 4,585,938 | 4/1986 | Neumann et al. | 250/235 |
| 4,638,156 | 1/1987 | Horikawa et al. | 250/235 |
| 4,647,145 | 3/1987 | Maeda et al. | 359/218 |
| 4,853,535 | 8/1989 | Suganuma | 250/235 |
| 5,012,089 | 4/1991 | Kurusu et al. | 250/235 |

FOREIGN PATENT DOCUMENTS 0015794 10/1991 European Pat. Off. ............ 359/217

Primary Examiner—Loha Ben
Attorney, Agent, or Firm—Ostrolenk, Faber, Gerb & Soffen

[57] ABSTRACT

A light beam scanning system for scanning an object with a light beam emitted from a light source to record or read images includes a lattice plate disposed in a position equivalent to a scanning plane of the light beam and extending in a primary scanning direction. The lattice plate includes a plurality of light transmitting sections each having a width substantially corresponding to a diameter of the light beam in an in-focus position. Photodiodes or the like are provided to detect quantity of the light beam having passed through the light transmitting sections of the lattice plate. Since the detected quantity of the light beam is correlated with focus displacement of the light beam, amounts of focus displacement of the light beam at different points in the primary scanning direction are determined from the detected quantity of the light beam. When recording an image, the quantity of the light beam is adjusted based on the determined amounts of focus displacement to equalize print line widths at different points in the primary scanning direction.

8 Claims, 12 Drawing Sheets

FIG. 16A
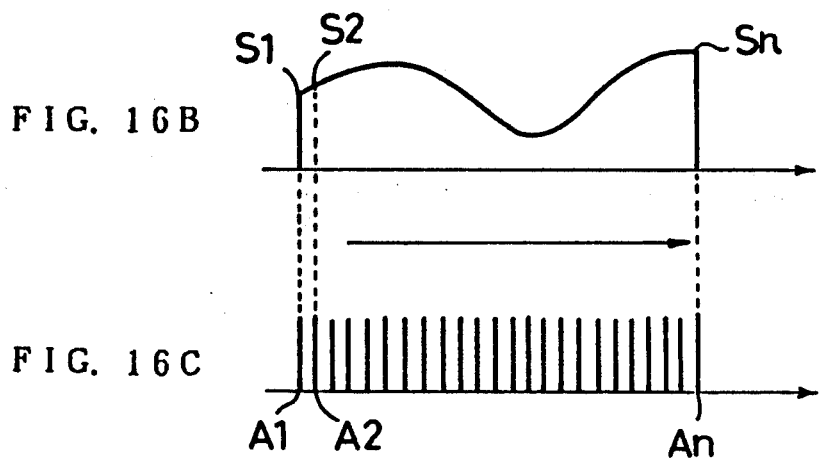
FIG. 16B
FIG. 16C
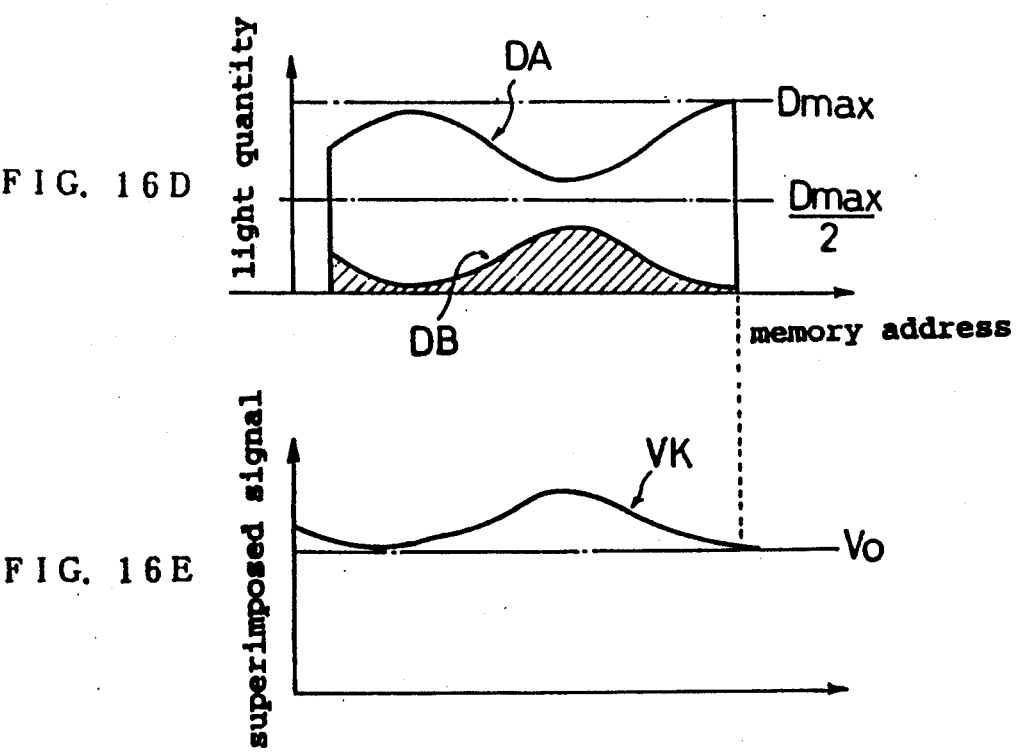
FIG. 16D
FIG. 16E

LIGHT BEAM SCANNING SYSTEM

BACKGROUND OF THE INVENTION (1) Field of the Invention

The present invention relates to a light beam scanning system for scanning an image with a light beam emitted from a light source to record or read the image. More particularly, the invention relates to a light beam scanning system capable of detecting focus displacement of a light beam on a scanning plane.

(2) Description of the Related Art

Where a light beam scanning system is used to record or read an image, it is desirable from the viewpoint of resolution that the light beam has a minimal diameter (a beam diameter at a focal point of the light beam, which is hereinafter referred to as a focus diameter) on the scanning plane.

In an ordinary light beam scanning system, therefore, a photosensitive film is set to the scanning plane prior to an actual scan. The film is then scanned by a light beam for printing of an image. A line width in the printed image provides the basis for determining whether the beam is focused on the scanning plane or not. In the event of a focus displacement, adjustment is effected between a position on the scanning plane and the focal point of the light beam.

According to the above method, the film must undergo a developing process in order to detect the focal point of the light beam, with the developed image subjected to observation by a skilled person. Thus, this method involves many steps, resulting not only in high cost but in low efficiency.

Under the circumstances, light beam scanning systems having a mechanism for detecting a light beam diameter have been proposed as in Japanese Patent Publications Nos. 1985-29087 and 1985-9243, for example. These systems will be described below.

(A) First, the system disclosed in Patent Publication No. 1985-29087 will be described with reference to FIG. 1.

In this system, a light beam emitted from a laser source 100 travels via a reflecting mirror 101 to a beam expander lens 102 and a collimator lens 103 to become a collimated beam. The collimated beam then travels via a scanning mirror 104 to a scanning lens 105 to be focused on a scanning plane 107. The scanning mirror 104 is oscillatable to cause the light beam to scan the scanning plane 107.

For detecting a light beam diameter occurring on the scanning plane 107, a half mirror 106 is disposed between the scanning lens 105 and scanning plane 107 to branch out part of the light beam. A lattice plate 109 is disposed on a virtual scanning plane 108 where the branched light beam focuses.

The lattice plate 109 has a lattice pattern with light transmitting sections and light shielding sections arranged alternately at intervals approximately corresponding to a focus diameter of the light beam. As illustrated, the lattice plate 109 is disposed at a predetermined angle to the virtual scanning plane 108.

Light transmitted through the lattice plate 109 is detected by an optical detector 110. At this time, a maximum quantity of light impinges on the detector 110 from the light transmitting section corresponding to the focal point of the light beam, which raises a detection signal level to a peak. If a central point A of the lattice plate 109 provides a detection signal in the highest level, the light beam has the focal point on the virtual scanning plane 108, which means that the light beam is also focused on the actual scanning plane 107. If the focus of the light beam is displaced from the scanning plane 107, the light transmitted through the lattice plate 109 provides a detection signal having a peak appearing in a position displaced from the central point A. Thus, the peak point of this detection signal is used to detect the focal point of the light beam on the scanning plane 107 and an amount of displacement between the position of the scanning plane 107 and the focal point of the light beam.

(B) The system disclosed in Patent Publication No. 1985-9243 will be described next with reference to FIG. 2.

In this system, a light beam emitted from a laser source 111 travels through a light modulator 112 and a beam expander 113 to a rotating polygon mirror 114 and then to a scanning lens (fθ lens) 115 to be focused on a scanning plane 116. The polygon mirror 114 is rotated to cause the light beam to scan the scanning plane 116.

For detecting a light beam diameter occurring on the scanning plane 116, a knife edge 118 is disposed on an extension from a scan line on the scanning plane 116. A photodetector 117 is disposed behind the knife edge 118.

The photodetector 117 detects a quantity of a light beam impinging on it through the knife edge 118, and generates a signal corresponding to a light beam diameter. That is, when the light beam has a large diameter, a gradually increasing quantity of light impinges on the photodetector 117 through the knife edge 118. When the light beam has a small diameter, a rapidly increasing quantity of light impinges on the photodetector 117.

In this way, the focus of the light beam is detected, and adjustment is made between the focal point of the light beam and the position of the scanning plane, on the basis of variations in the detection signal outputted from the photodetector 117, which variations are responsive to the light beam diameter.

The conventional scanning systems with the foregoing constructions have the following disadvantage.

The system described under (A) above detects a quantity of light transmitted through the inclined lattice plate 109 and determines a focal point of the light beam from a peak position of the detection signal. This system does not detect the focal point throughout a scanning width of the light beam. Similarly, the system described under (B) can detect the focus of the light beam only at one point on the extension from a scan line.

However, the light beam may have different diameters at different points on the same scan line, which is due to distortions occurring with optical elements such as a scanning lens and polygon mirror or deviations from correct positions. It is, therefore, inadequate to detect the focus of the light beam only at a single point as in the conventional systems.

The conventional systems are incapable of detecting the light beam out of focus on a scan line not corresponding to the point of detection. As a result, an image is recorded or read with a low degree of resolution, i.e. leading to the problem of a blurred image.

SUMMARY OF THE INVENTION

The present invention has been made having regard to the state of the art noted above, and its object is to provide a light beam scanning system capable of focus detection throughout a scanning width.

Another object of the present invention is to provide a light beam scanning system for adjusting a quantity of light in a light beam by using focus displacements detected throughout a scanning width, thereby to make a print line width at various points in a primary scanning direction equal to a focus diameter.

The above objects are fulfilled, according to the present invention, by a light beam scanning system for scanning an object with a light beam emitted from a light source, including:

a lattice plate disposed in a position equivalent to a scanning plane of the light beam and extending in a primary scanning direction, the lattice plate including a plurality of light transmitting sections each having a width substantially corresponding to a diameter of the light beam in an in-focus position;

a light quantity detecting device for detecting light quantity of the light beam having passed through the light transmitting sections; and a focus displacement determining device for determining amounts of focus displacement of the light beam at different points in the primary scanning direction from levels of a detection signal provided by the light quantity detecting device.

The lattice plate is, for example, a grating glass plate defining slit-like light transmitting sections each having a width substantially corresponding the diameter of the light beam in an in-focus position, and light shielding sections arranged alternately with the light transmitting sections. The light quantity detecting device includes, for example, a plurality of photodiodes arranged along a side opposite a light beam impinging side of the grating glass plate.

The lattice plate is not limited to any particular position as long as the lattice plate extends in the primary scanning direction in a position optically equivalent to the scanning plane of the light beam emitted from the light source. Where a branching optical element is provided for branching the light beam to travel in two directions, one part of the light beam scanning an actual scanning plane (e.g. a photosensitive sheet), and the other part thereof scanning a virtual scanning plane optically equivalent to the actual scanning plane, the lattice plate is set to the virtual scanning plane.

Alternatively, the lattice plate may be set flush with the scanning plane actually scanned by the light beam.

The focus displacement determining device, specifically, includes:

a pulse generator responsive to the detection signal outputted from the focus displacement determining device for generating clock pulses corresponding to incidence timing of the light beam with respect to the light transmitting sections;

a sampling device responsive to timing of the clock pulses for sampling the detection signal of the light quantity detecting device;

an analog-to-digital converter for converting sampled levels of the detection signal into digital signals (light quantity data);

a pulse counter for counting the clock pulses outputted from the pulse generator;

a light quantity storage for successively storing the light quantity data from the analog-digital converter at storage addresses corresponding to counts provided by the pulse counter;

a light quantity data converter for converting the light quantity data successively read from the light quantity data storage into amounts of focus displacement corresponding to the light quantity data; and an output device for outputting the amounts of focus displacement provided by the light quantity converter.

According to the present invention as described above, when the lattice plate is scanned over an entire scanning range by the light beam, the light quantity detecting device outputs a detection signal corresponding to a light beam diameter. That is, if the light beam is focused on the lattice plate, the entire quantity of the light beam passes through the light transmitting sections of the lattice plate, such that the detection signal reaches a maximum level. If the light beam is out of focus (the light beam diameter is larger than a focus diameter), part of the light beam quantity is blocked by the light shielding sections, such that the detection signal becomes lower than its maximum level.

Since the output of the light quantity detecting device is correlated with the amount of focus displacement of the light beam, the focus displacement determining device determines amounts of focus displacement of the light beam at different points in the primary scanning direction from the detected quantity of the light beam passing through the light transmitting sections of the lattice plate.

According to the present invention, therefore, the light beam may be focused throughout the scanning plane by adjusting the focal point relative to the scanning position with reference to the amounts of focus displacement at different points in the primary scanning direction. This feature improves resolution when an image is recorded or read.

The light beam scanning system of the present invention may further include a light quantity adjusting device responsive to the amounts of focus displacement determined by the focus displacement determining device for adjusting the light quantity of the light beam to equalize print line widths at the different points in the primary scanning direction.

Specifically, the light quantity adjusting device includes:

a focus displacement data storage for storing data of the amounts of focus displacement determined by the focus displacement determining device at addresses corresponding to the different points in the primary scanning direction;

a data read device for reading the data of the amounts of focus displacement from the focus displacement data storage device synchronously with scanning of the light beam in the primary scanning direction at a time of scanning and recording by the light beam;

an image signal modulator for modulating levels of an image recording signal based on the data of the amounts of focus displacement read from the focus displacement data storage; and a light beam modulator for modulating an energy level of the light beam based on an output of the image signal modulator.

According to the present invention, with the light quantity adjusting device additionally provided, the quantity of the light beam is adjusted based on the determined amounts of focus displacement, thereby to equalize print line widths at different points in the primary scanning direction. Even if the light beam is out of focus at a certain position in the primary scanning direction, the optical system need not be adjusted as in the prior art. This feature promotes operability, and besides realizes high quality image recording.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIGS. 16A through 16E are waveform diagrams of signals outputted from various components of the logic circuitry shown in FIG. 15.

DETAILED DESCRIPTION OF THE PREFERRED EMBODIMENTS

Preferred embodiments of the present invention will be described in detail hereinafter with reference to the drawings.

FIRST EMBODIMENT

Figure 1:
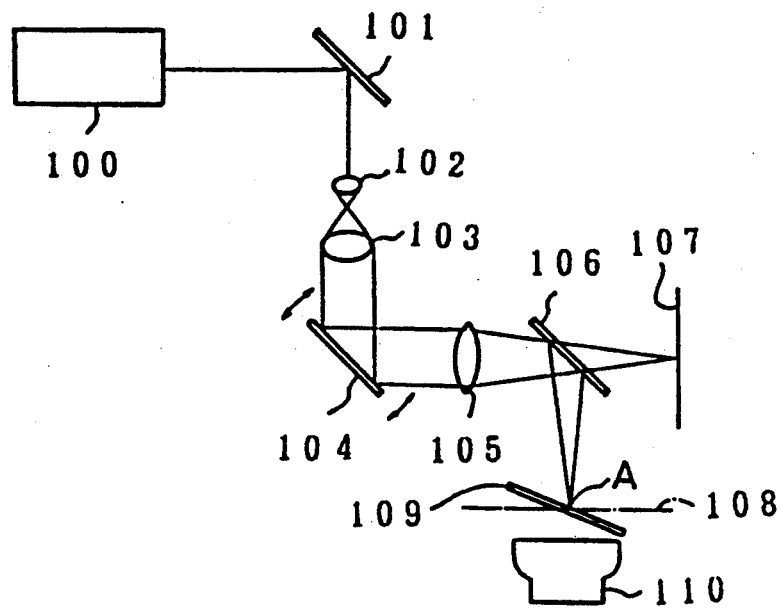
FIG. 1 is a schematic view of a first conventional system.
Figure 2:
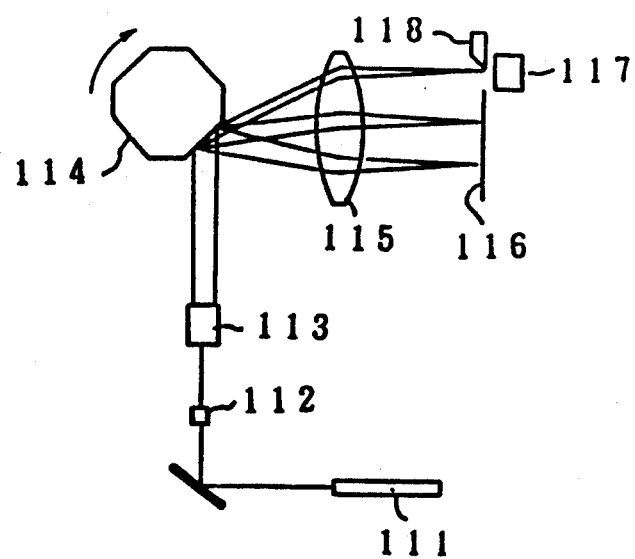
FIG. 2 is a schematic view of a second conventional system.
Figure 3:
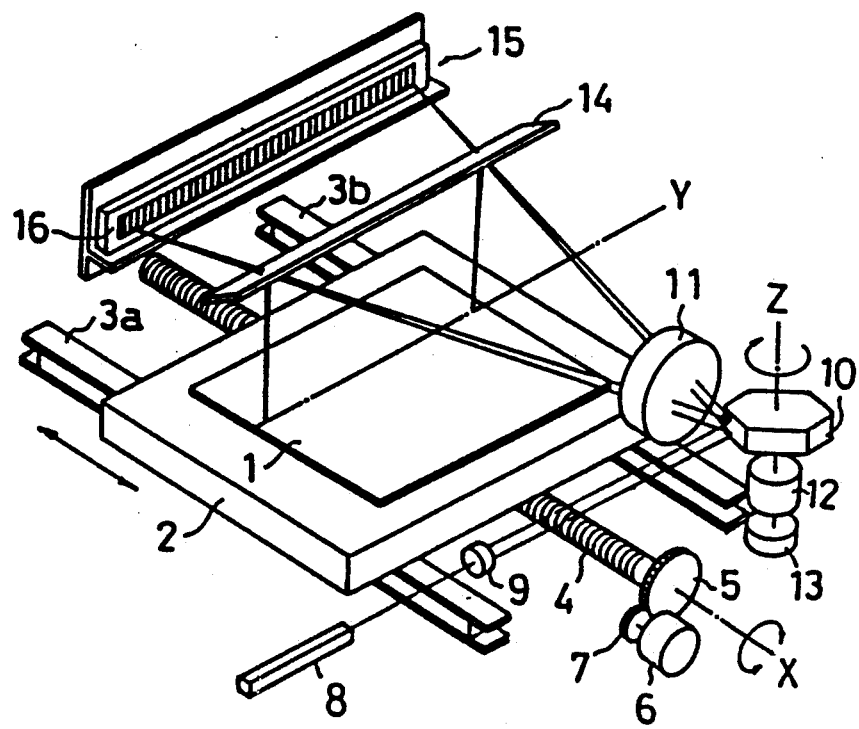
FIG. 3 is a schematic perspective view of a light beam scanning system in a first embodiment of the present invention.

FIG. 3 is a schematic perspective view of a light beam scanning system in this embodiment. The illustrated light beam scanning system is used for image recording. The present invention is applicable to a light beam scanning system used for image reading as well.

In this system, a photosensitive sheet 1 is placed on a movable table 2 which is supported for movement on a pair of guide rails 3a and 3b. A screw shaft 4, which is under the movable table 2, has a gear 5 fixed to one end of the shaft 4 and meshed with an output gear 7 of a motor 6.

The screw shaft 4 is rotated by the motor 6 and causes the movable table 2 to move in the direction of the X-axis along the guide rails 3a and 3b. The direction of the X-axis corresponds to a secondary scanning direction of a light beam projected on the photosensitive sheet 1.

The light beam is emitted from a laser source 8 and changed into a broad collimated beam by a beam expander 9. Then, the light beam is deflected by a polygon mirror 10 to travel in the direction of the Y-axis and is thereafter converged by an $f\theta$ lens 11. The polygon mirror 10 is rotatable about a Z-axis by a motor 12. The direction of the Y-axis corresponds to a primary scanning direction of the light beam.

Numeral 13 in FIG. 3 denotes a rotary encoder for detecting "one rotation" of the polygon mirror 10 from rotational rate of the motor 12, and outputting a detection signal to a logic circuit described later.

The light beam converged by the $f\theta$ lens 11 is branched off by a half mirror 14 disposed above the photosensitive sheet 1. One branched part of the light beam is projected to the photosensitive sheet 1, while the other branched part impinges on a sensor unit 15 disposed on the opposite side of the half mirror 14. The sensor unit 15 is set to a virtual scanning plane where the other branched part of the light beam focuses (the virtual scanning plane being in an optically equivalent positional relationship with an actual scanning plane).

Figure 4:
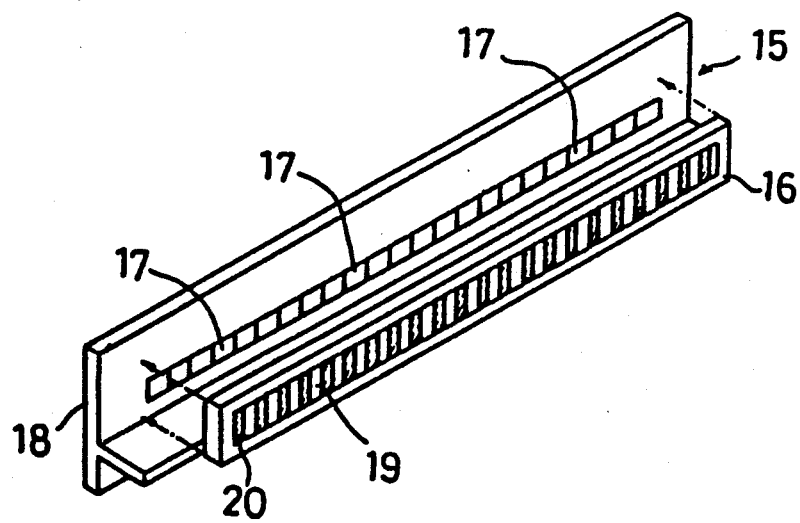
FIG. 4 is an enlarged perspective view of a sensor unit.

FIG. 4 is an enlarged perspective view of the sensor unit 15.

The sensor unit 15 includes a grating glass plate 16 having slit-like light transmitting sections 19 and light shielding sections 20 arranged alternately, and a sensor deck 18 rigidly connected to the glass plate 16 and carrying a plurality of photodiodes 17 arranged horizontally. Each light transmitting section 19 has a width approximately corresponding to a focus diameter of the light beam. The photodiodes 17 are arranged over the entire region of the grating glass plate 16. The grating glass plate 16 corresponds to the lattice plate according to the present invention. The photodiodes 17 constitute a light quantity detecting device.

Figure 5:
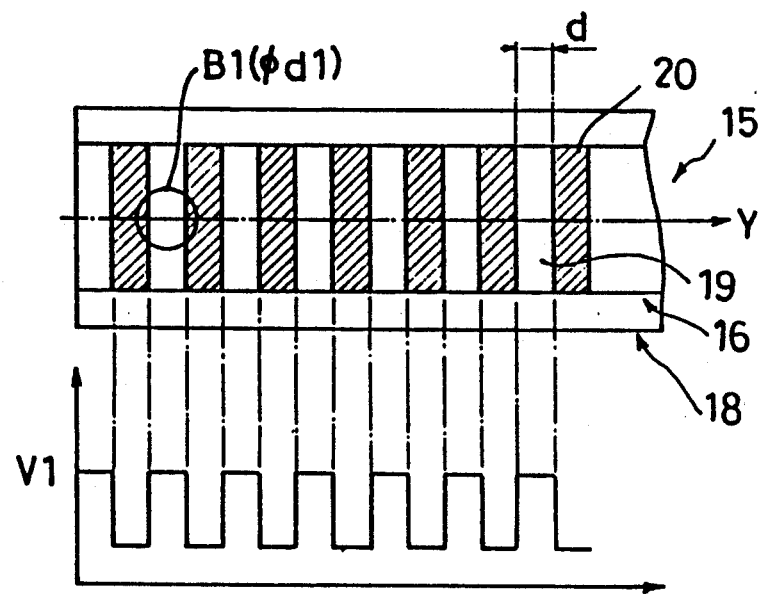
FIGS. 5 and 6 are views showing relations between light beam diameter and output voltage of photodiodes.
Figure 6:
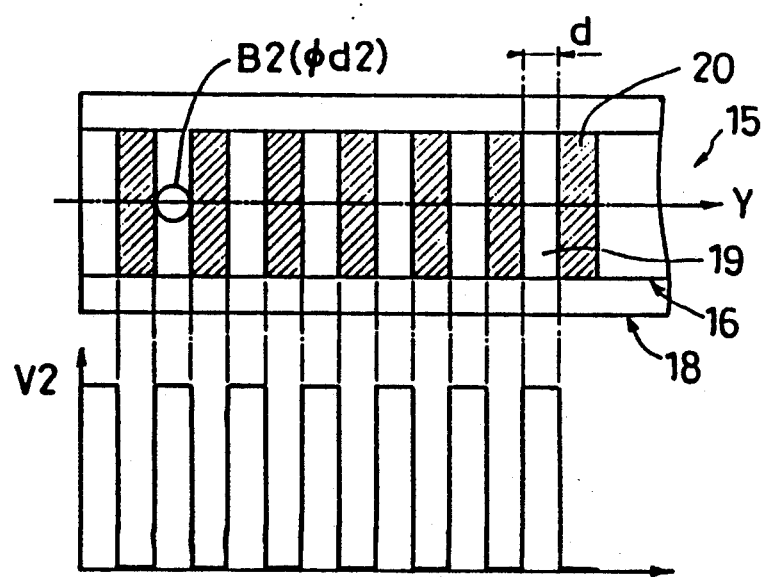

FIGS. 5 and 6 show relations between diameters of the light beam impinging on the sensor unit 15 and output voltages of the photodiodes 17, respectively.

As shown in FIG. 5, the photodiodes 17 output a voltage V1 when a light beam B1 branched by the half mirror 14 and impinging on the sensor unit 15 has a beam diameter $\phi d1$ which is larger than a width d of each light transmitting section 19 ($\phi d1 > d$).

On the other hand, as shown in FIG. 6, the photodiodes 17 output a voltage V2 which is higher than the voltage V1 ($V2 > V1$) when a light beam B2 has a beam diameter $\phi d2$ which is approximately the same as the width d of each light transmitting section 19 ($\phi d2 \approx d$).

That is, when the light beam diameter is larger than the width d, the light shielding sections 20 shield part of its light quantity, such that the output voltages of the photodiodes 17 become lower than a maximum level. When the light beam diameter is approximately the same as the width d of each light transmitting section 19 (which represents a focus diameter size), the light beam impinges in full quantity on the photodiodes 17, such that the output voltages of the photodiodes 17 reach the maximum level. Thus, the output voltage of the photodiodes 17 is variable with the light beam diameter.

The light beam diameter occurring on the scanning plane (on the photosensitive sheet 1) may be detected by this principle. Moreover, the light beam diameter may be detected over an entire range in the scanning direction since direct use is made of the light beam deflected by the polygon mirror 10 and branched by the half mirror 14.

Figure 7:
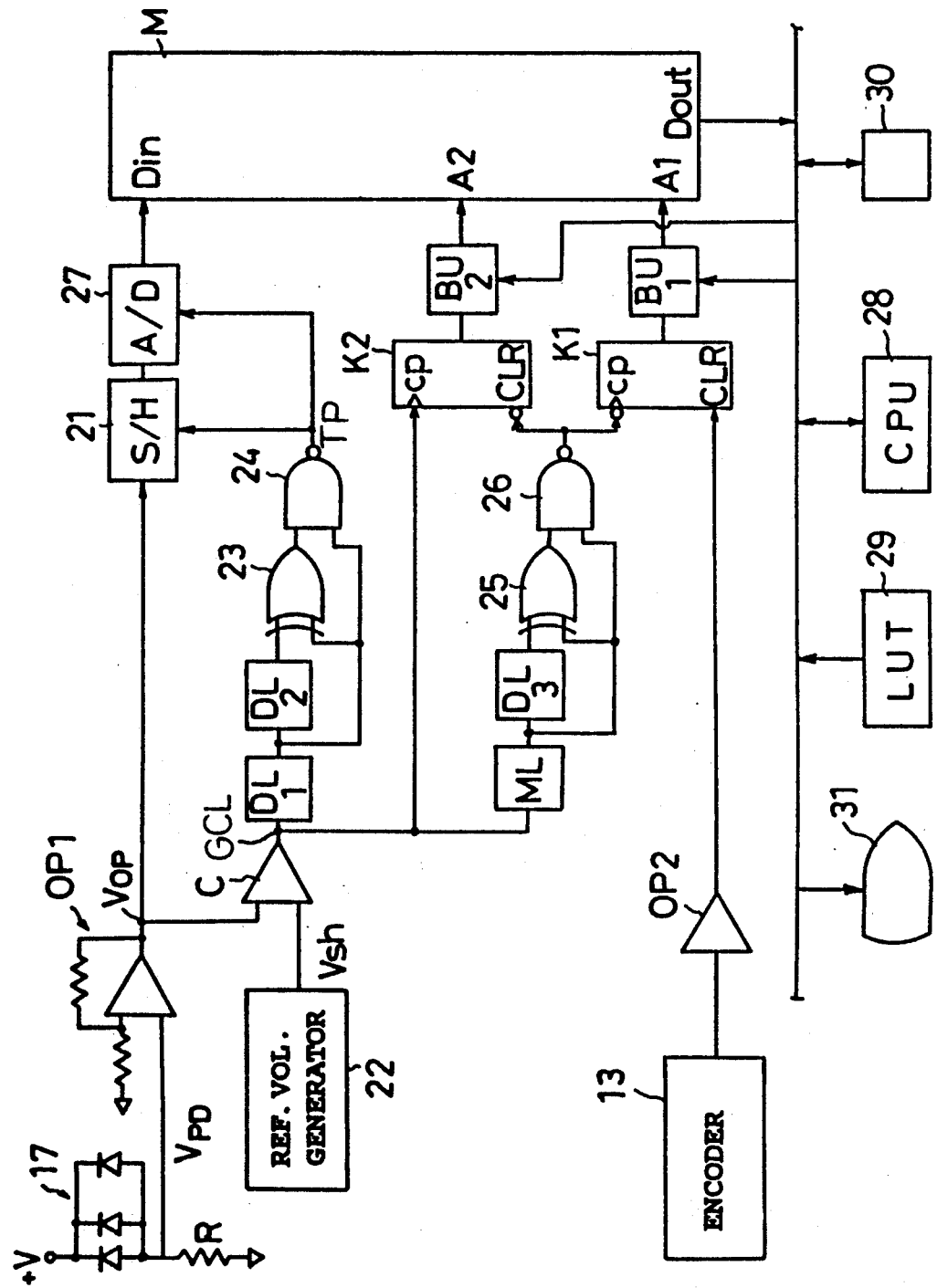
FIG. 7 is a block diagram of logic circuitry for computing focus displacement.

A way in which amounts of displacement between focal point and scanning plane are derived from the output voltages of the photodiodes 17 will be described next with reference to the logic circuitry shown in FIG. 7.

Figure 8:
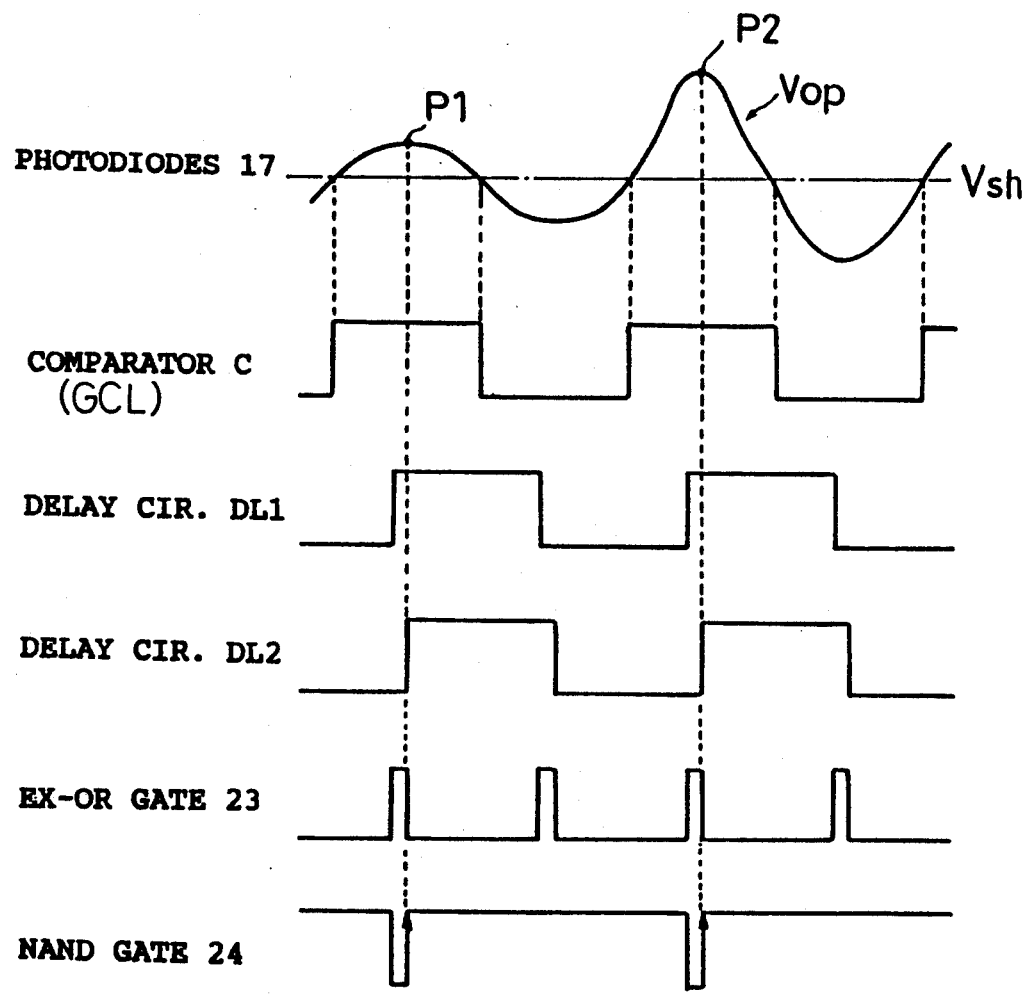
FIGS. 8 and 9 are waveform diagrams of signals outputted from various components of the logic circuitry.

First, an operation to write the output voltages of the photodiodes 17 to a memory M will be described referring also to the timing chart shown in FIG. 8.

An output voltage VPD of each photodiode 17, which is in proportion to an output current of the photodiode 17 reverse-biased by a reference voltage +V, is amplified by an operational amplifier OP1 to an output voltage VOP. This voltage VOP is applied to a sampling hold circuit 21 and a comparator C.

The comparator C compares the output voltage VOP from each photodiode 17 and a reference voltage Vsh from a reference voltage generating circuit 22. When the output voltage VOP is higher than the reference voltage Vsh, the comparator C outputs a signal in "H-level". Consequently, a pulse signal is outputted which becomes "H-level" when the light beam impinges on the light transmitting sections 19. This pulse signal is hereinafter referred to as grating clock (i.e. clock pulses outputted according to the pitch of the light transmitting sections 19 formed on the grating glass plate 16).

The grating clock GCL is outputted to a delay circuit DL1, an address counter K2 and a one-shot multivibrator ML.

(a) The delay circuit DL1 and succeeding circuits generate a timing signal based on the grating clock GCL for converting the output voltage VOP of each photodiode 17 into a digital value.

(b) The address counter K2, one-shot multivibrator ML and succeeding circuits generate an address signal based on the grating clock GCL for writing the digital value to the memory M.

Details of the above operations (a) and (b) are as follows:

(a) The delay circuit DL1 and delay circuit DL2 delay the grating clock GCL, respectively, for application to an exclusive-OR gate 23 and a NAND gate 24. The NAND gate 24 outputs timing pulses TP which become an active signal when the output voltage VOP of each photodiode 17 approaches a peak.

This takes place because the delay circuit DL2 has a delay time set to a halfway point in a pulsewidth of the grating clock GCL. That is, the center of the pulsewidth of the grating clock GCL corresponds to the center of the light beam passing through each light transmitting section 19, and upon which, the output voltage VOP of each photodiode 17 reaches a peak.

The timing pulses TP outputted from the NAND gate 24 are applied to the sampling hold circuit 21 and an analog-to-digital converter 27. As a result, peaks P1, P2 and so on of the output voltages VOP of the photodiodes 17 are sampled and converted into digital signals.

(b) The address counter K2 counts "H-level" pulses in the grating clock GCL, which are stored in a buffer BU2 as lower-order addresses A2 for writing. The lower-order addresses A2 correspond to positions of the respective light transmitting sections 19 in the grating glass plate 16.

Figure 9:
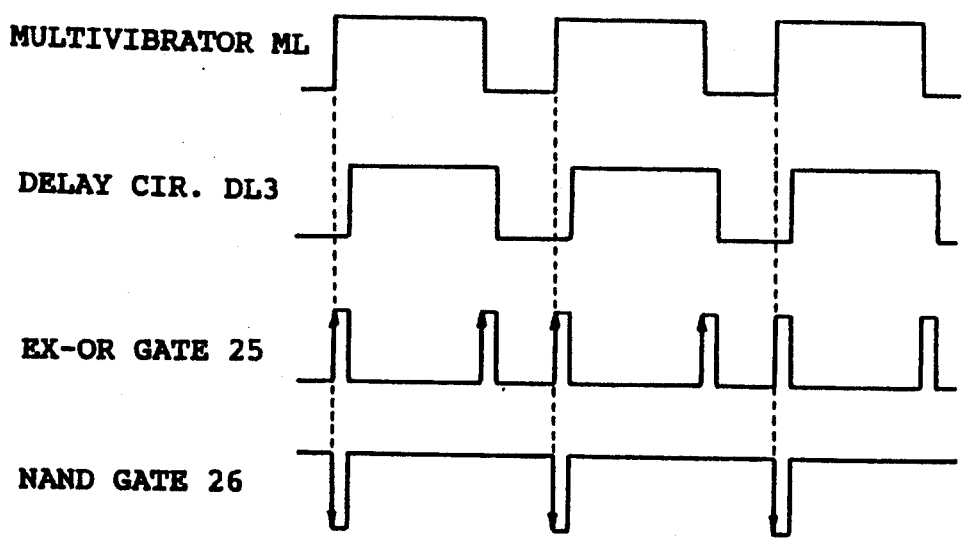

The one-shot multivibrator ML, to which also the grating clock GCL is applied, generates a pulse signal as shown in FIG. 9. This pulse signal is produced by shaping a plurality of grating clock GCL signals generated when the light beam is deflected by one of six surfaces of the polygon mirror 10. This signal is hereinafter referred to as a surface pulse signal. The surface pulse signal is outputted to the delay circuit DL3 and a NAND gate 26.

The delay circuit DL3, after delaying the signal for a predetermined time, applies the surface pulse signal to an exclusive-OR gate 25 and the NAND gate 26. Then the NAND gate 26 outputs a pulse signal which rises when the surface pulse signal becomes active.

An active-low address counter K1 counts pulses of the surface pulse signal outputted from the NAND gate 26, which are stored in a buffer BU1 as upper-order addresses A1. The upper-order addresses A1 correspond to the respective surfaces of the polygon mirror 10.

The buffers BU1 and BU2 storing the upper-order addresses and lower-order addresses, respectively, are controlled by a CPU 28 to output address signals to the memory M insyne with the converting operation of the analog-to-digital converter 27.

Thus, the memory M stores peak light quantity data of the light beam deflected by the surfaces of the polygon mirror 10 according to the pitch of the light transmitting sections 19.

The address counter K2 for counting the lower-order addresses is reset by the surface pulse signal. The address counter K1 is reset by the output signal (corresponding to one rotation of the polygon mirror 10) of the rotary encoder 13 which is amplified by an amplifier OP2.

Figure 10:
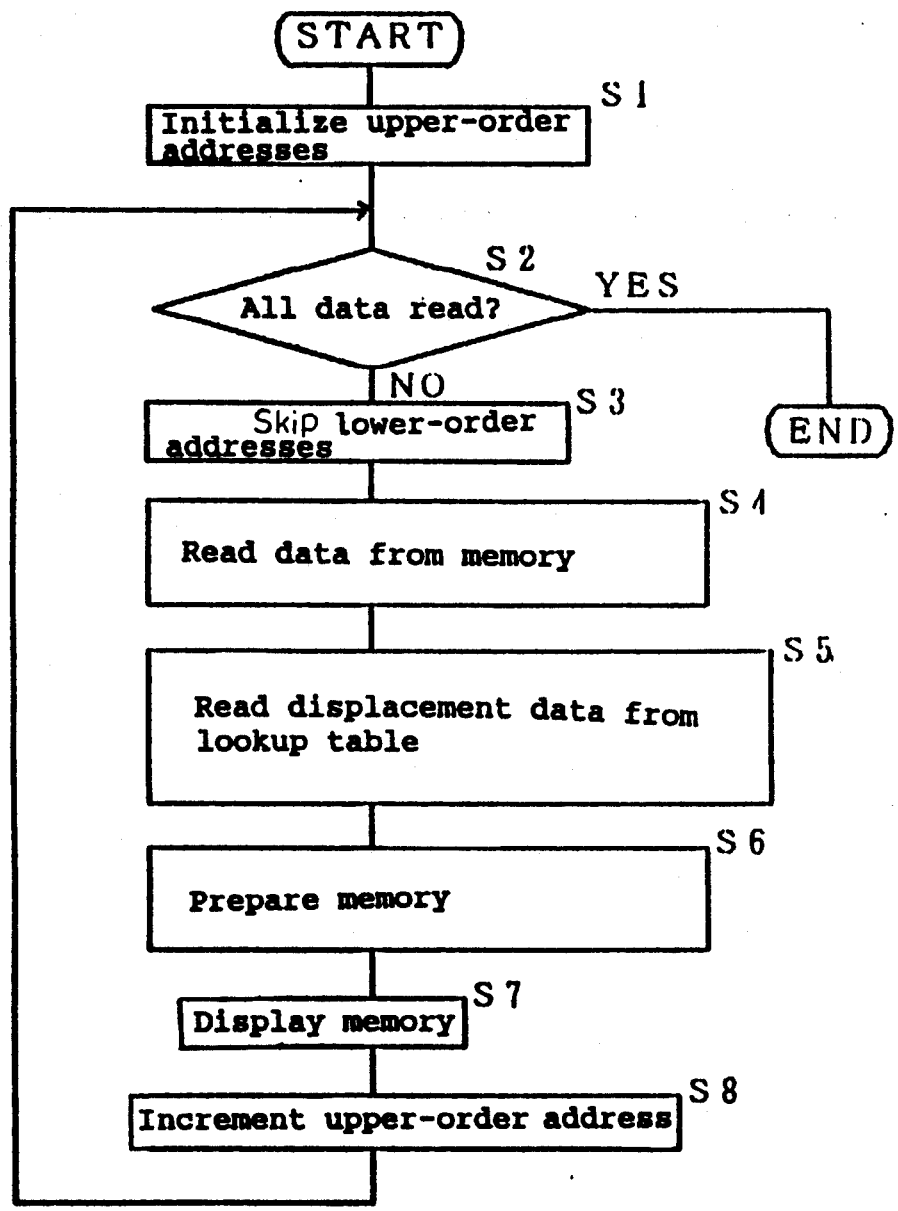
FIG. 10 is a flowchart of a processing sequence followed by a CPU in determining an amount of displacement.

A way in which focus displacement of the light beam on the scanning plane (photosensitive sheet 1) is derived from the light quantity data stored in the memory M will be described with reference to the flowchart shown in FIG. 10. FIG. 10 shows a processing sequence followed by the CPU 28 acting as a computing device.

First, at step S1, the upper-order addresses for reading from the memory M are initialized, that is the first surface of the polygon mirror 10 that has deflected the light beam is designated.

At step S2 it is determined whether or not all the peak light quantity data stored in memory M has been read from the memory M. If not, the operation proceeds to step S3. On the other hand, if all the data stored in memory M has been read, the operation ends.

At step S3, the lower-order addresses are skipped. The grating glass plate 16 includes about 1,000 light transmitting sections 19, for example, and the memory stores a corresponding number of light quantity data. An extended processing time would be required if these numerous data were all read to carry out the subsequent processing. To avoid this, the data are sampled by skipping the lower-order addresses at appropriate intervals.

At step S4, the upper-order address and skipped lower-order addresses are designated to the memory M for reading the light quantity data.

Figure 11:
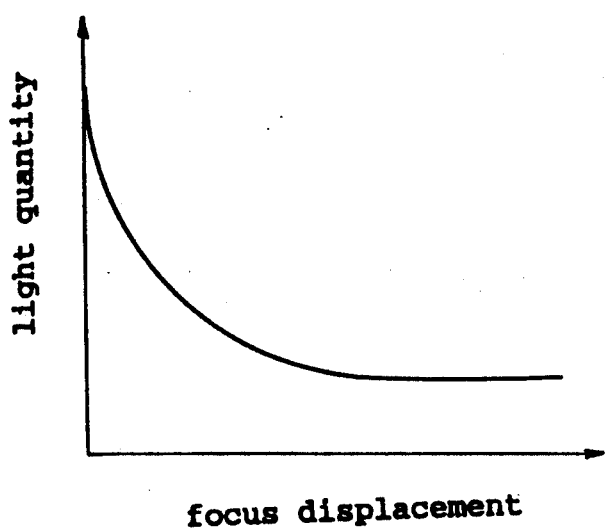
FIG. 11 is a view schematically showing contents of a lookup table.

At step S5, the light quantity data read are applied as addresses to a lookup table 29 (FIG. 7) for reading corresponding data. FIG. 11 shows, in graph form, the contents of the lookup table 29. The lookup table 29 is a two-dimensional table obtained by experiment in advance and storing relations between quantity of light and amount of focus displacement. As seen, the larger the quantity of light, the smaller the amount of focus displacement.

Figure 12:
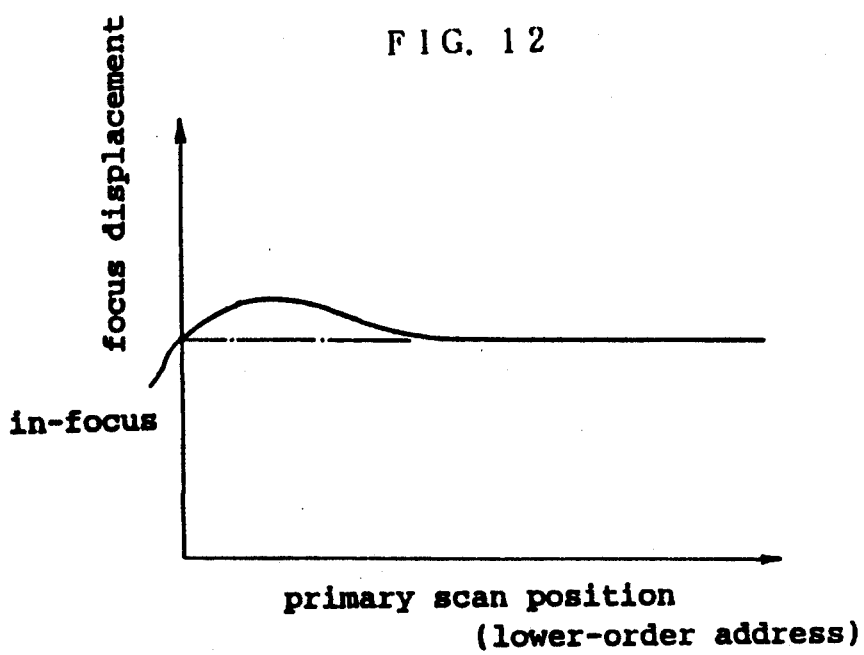
FIG. 12 is a view showing relations between focus displacement and primary scan position.

At step S6, a graph is prepared in which the vertical axis represents the amounts of focus displacement read, and the horizontal axis represents the lower-order addresses. The lower-order addresses correspond to the pulses in the grating clock GCL pitch of the light transmitting sections 19), and hence information showing main scan positions of the light beam. Consequently, by preparing the graph with the horizontal axis showing the lower-order addresses, and the vertical axis showing the amounts of focus displacement, it can be determined where on the scanning plane the focus is displaced and to what extent. FIG. 12 shows an example of such graph, which is stored in a display memory 30.

At step S7, the graph is presented on a monitor display 31. A printer may be provided in place of the monitor display 31 for outputting the graph in print.

At step S8, the upper-order address is incremented to designate the next deflecting surface of the polygon mirror 10. Then, the operation returns to step S2 to repeat the above process.

In this way, focus displacement is detected with respect to the entire scanning range of the light beam, and the results are shown on the monitor display 31.

The lattice plate is not limited to the grating glass plate as in the foregoing embodiment, but may be an object having light transmitting sections arranged only in positions for detecting focus displacement of the light beam.

Further, instead of directly displaying the amounts of focus displacement as above, the amounts of focus displacement may be displayed indirectly by showing beam diameters at a plurality of positions in the primary scanning direction. Such determination of the beam diameter is included within the scope of the present invention since the amount of focus displacement and beam diameter are correlated.

SECOND EMBODIMENT

A second embodiment of the present invention will now be described with reference to the drawings.

Figure 13:
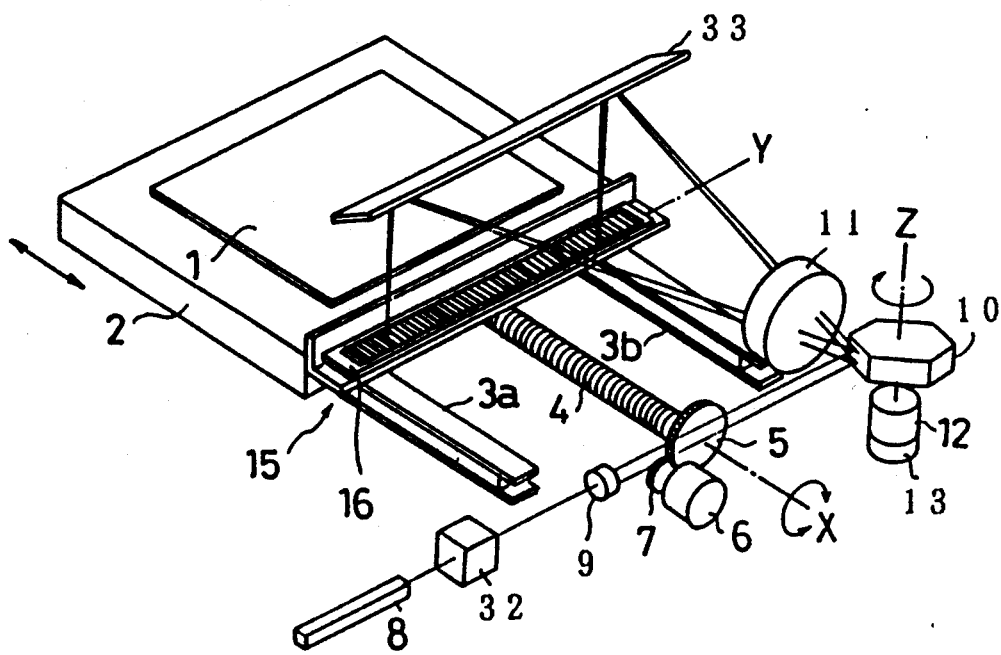
FIG. 13 is a schematic perspective view of a light beam scanning system in a second embodiment of the invention.

FIG. 13 is a schematic perspective view of a light beam scanning system in this embodiment.

In FIG. 13, like reference numerals are used to identify like parts in FIG. 3, which are the same as in the first embodiment and will not particularly be described again.

Figure 14:
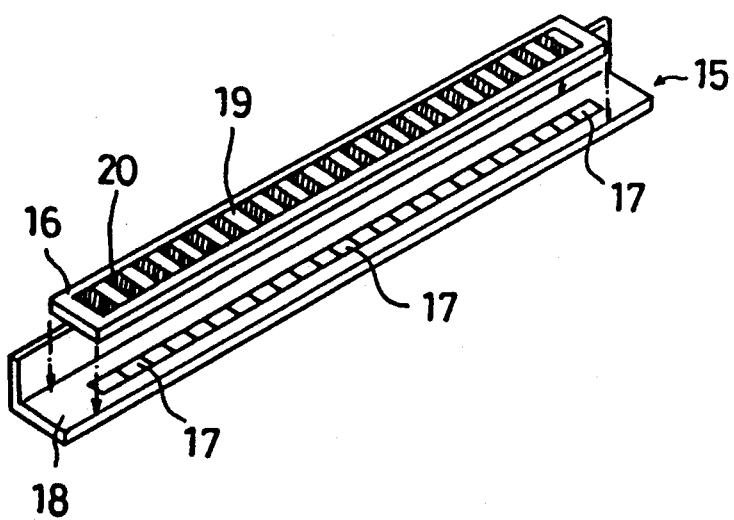
FIG. 14 is an enlarged perspective view of a sensor unit in the second embodiment.

In the first embodiment, the sensor unit 15 is positioned on the virtual scanning plane of the light beam branched off by the half mirror 14. In the second embodiment, as shown in FIG. 13, the sensor unit 15 is set to one end of the movable table 2 with respect to the moving direction of the table 2 which is optically equivalent to the scanning plane. In other words, the sensor unit 15 is set so that the grating glass plate 16 is flush with the actual scanning plane. In this embodiment, a total reflection mirror 33 is used in place of the half mirror 14 to scan the sensor unit 15 with a light beam to detect focus displacement prior to an actual scan. FIG. 14 shows the sensor unit 15 employed in this embodiment.

This embodiment further includes an AOM (AcoustoOptic Modulator utilizing an acousto-optic effect) 32 disposed between the laser source 8 and beam expander 9 for modulating the quantity of the scanning light beam emitted from the laser source 8.

When recording an image with the light beam scanning system having the above construction, (1) the movable table 2 is moved such that the sensor unit 15, path mounted at the end of the table 2, is scanned with the laser beam. An amount of focus displacement of the light beam is determined from an output voltage of each photodiode 17 (which is hereinafter referred to as a determining mode).

(2) In recording the image, the quantity of the light beam is adjusted on the basis of the focus displacement occurring at various points in the primary scanning direction determined as above, to obtain a constant print line width at those points in the primary scanning direction (which is hereinafter referred to as a recording mode).

The above determining mode and recording mode are switchable on instructions given by the operator.

Operations in the determining mode (1) and recording mode (2) will be described in detail below.

Figure 15:
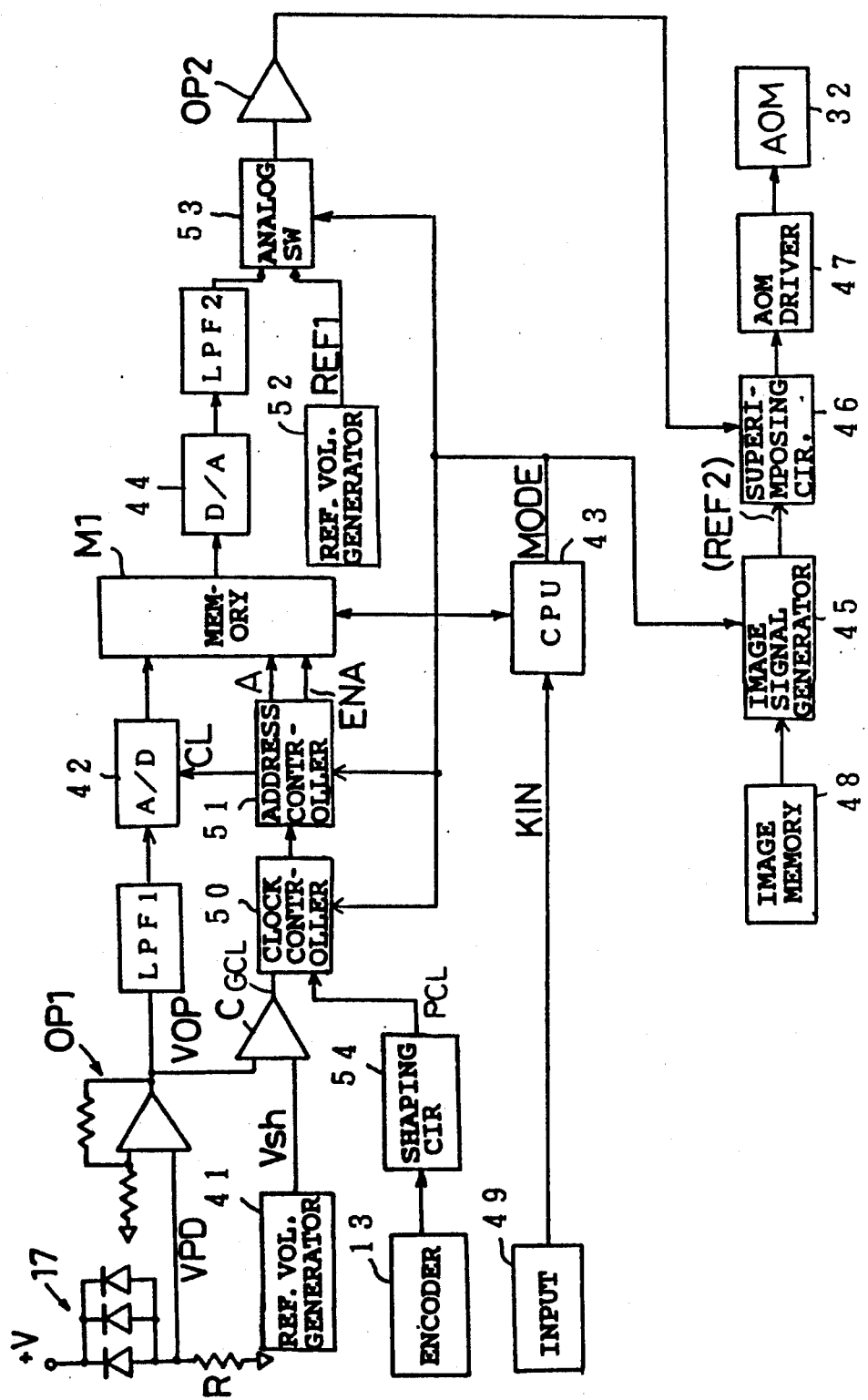
FIG. 15 is a block diagram of logic circuitry in the second embodiment for computing focus displacement.

(1) As described in the first embodiment with reference to FIGS. 5 and 6, the output voltage of each photodiode 17 in the sensor unit 15 is variable with the light beam diameter. A way in which the focus displacement of the light beam is derived from the output voltage of each photodiode 17 will be described with reference to the logic circuitry shown in FIG. 15 and the signal waveforms shown in FIG. 16.

When the operator selects the determining mode through an input unit 49, this information is outputted as an input signal KIN to a CPU 43. The CPU 43 outputs a mode signal MODE corresponding to the determining mode to a clock controller 50, an address controller 51, an analog switch 53 and an image signal generator 45.

When the determining mode is selected, the analog switch 53 selects, from two inputs, the input from a reference voltage generator 52. As a result, an output signal REF1 of the reference voltage generator 52 is amplified by an amplifier OP2 and then outputted to a superimposition circuit 46 having a multiplying function. The image signal generator 45 outputs a fixed reference density signal REF2.

The superimposition circuit 46 receives, at one of the inputs thereof, the reference density signal REF2 from the image signal generator 45. Since the two signals REF1 and REF2 inputted to the superimposition circuit 46 are fixed, the superimposition circuit 46 outputs a fixed signal. Consequently, an AOM drive circuit 47 outputs a fixed signal to fix the quantity of light beam modulated by the AOM 32.

In this state, the polygon mirror 10 is rotated to cause the light beam to scan the grating glass plate 16 in the primary scanning direction.

At this time, an output voltage VPD proportional to an output current of each photodiode 17 reverse-biased by a reference voltage $+V$ is amplified by an operational amplifier OP1 to an output voltage VOP (whose waveform is shown in FIG. 16A). The output voltage VOP is applied to a low-pass filter LPF1 and a comparator C.

The low-pass filter LPF1 smooths the waveform of the output voltage VOP, and outputs it to an analog-to-digital converter 42 in a smoothly continuous analog waveform as shown in FIG. 16B.

The comparator C compares the output voltage VOP from the operational amplifier OP1 and a reference voltage Vsh from a reference voltage generator 41. When the output voltage VOP is higher than the reference voltage Vsh, the comparator C outputs a signal in "H-level". Consequently, a pulse signal (grating clock) is outputted which becomes "H-level" when the light beam impinges on the light transmitting sections 19. FIG. 16C shows this grating clock GCL.

The clock controller 50, in response to the signal MODE, selects and outputs one of the two signals which have been inputted. In the determining mode, the clock controller 50 selects and outputs the output signal from the comparator C, i.e. the grating clock GCL.

The address controller 51 counts pulses in the grating clock GCL and derives memory address data A (A1-An). At this time, the address controller 51 also outputs an enable signal ENA to a memory M1 to enable data written to the memory M1.

Further, the address controller 51 outputs a clock signal CL to the analog-to-digital converter 42 to sample timing with which the converter 42 outputs a digital signal to the memory M1. In the determining mode, the clock signal CL is synchronized with the grating clock GCL.

The analog-to-digital converter 42 samples the output voltages of the low-pass filter LPF1 (S1 to Sn in FIG. 16B) synchronously with pulse timing of the clock signal CL and converts the voltages into the digital signal for output to the memory M1. Data in the digital signal are successively stored at addresses designated by the memory address data outputted from the address controller 51.

As a result, the memory M1 stores light quantity data for one scan line according to the pitch of the light transmitting sections 19 in the grating glass plate 16. The data stored in the memory M1 may be shown in waveform DA as in FIG. 16D.

In FIG. 16D, reference Dmax denotes a maximum light quantity data, that is a data of a light quantity occurring when the light beam is focused on the grating glass plate 16 (which is hereinafter referred to as a focus light quantity).

The CPU 43 acts as a focus displacement determining device for reading the light quantity data from the memory M1 and subtracting these data from the maximum light quantity data Dmax (focus light quantity data) to obtain inverse characteristic data having a waveform inverted from the waveform of the light quantity data. These data correspond to the focus displacement data according to the present invention, which become zero when coinciding with the focus light quantity and take the greater value the more displaced the data are from the focus light quantity. These data are depicted in a hatched portion DB in FIG. 16D. The focus displacement data DB obtained are temporarily stored in areas of the memory M1 different from the areas (addresses) where the light quantity data are stored.

(2) Once amounts of focus displacement are determined, an actual recording operation is carried out while effecting light quantity adjustment as follows.

When the operator selects the recording mode through the input unit 49, this information is outputted as the input signal KIN to the CPU 43. The CPU 43 outputs a mode signal MODE corresponding to the recording mode to the clock controller 50, address controller 51, analog switch 53 and image signal generator 45.

The clock controller 50, in response to the signal MODE corresponding to the recording mode, selects one of the two inputted signals, which is a pulse signal converted by a waveform shaping circuit 54 from an output signal from the encoder 13 mounted in the motor 12. On the basis of this pulse signal, the clock controller 50 generates a pseudo clock signal PCL corresponding to the grating clock GCL and representing positions of impingement of the light beam.

The address controller 51 counts pulses in the pseudo clock signal PCL, computes memory address data A (A1-An), and reads the data from the memory M1. At this time, the address controller 51 also outputs the enable signal ENA to the memory M1 to enable data to be read from the memory M1.

The analog switch 53 selects, from the two inputs, an input from a low-pass filter LPF2.

The image signal generator 45 converts image data stored in an image memory 48 into an analog image signal for forming dot images. This analog signal has "zero volts" for unexposed portions and "several volts" for exposed portions.

The CPU 43 reads the focus displacement data DB from the memory M1 corresponding to the address data A1-An outputted from the address controller 51 and applies the data DB to a digital-to-analog converter 44 and the low-pass filter LPF2. The data DB are then converted into a smoothly continuous analog signal. This focus displacement signal is amplified by the amplifier OP2 and outputted to the superimposition circuit 46 having a multiplying function.

The superimposition circuit 46 receives, at one of the inputs, the analog image signal from the image signal generator 45. The superimposition circuit 46 multiplies the analog image signal by the focus displacement signal and outputs the product to the driver circuit 47 for driving the AOM 32. The driver circuit 47, superimposition circuit 46 and AOM 32 constitute a light quantity adjusting device of the present invention.

The superimposed signal is "zero volt" when the analog image signal is "zero volt", but its voltage level is variable with the focus displacement signal when the analog image signal is in a voltage level of "several volts". FIG. 16E shows an example of a waveform of the superimposed signal. In FIG. 16E, reference V0 denotes a fixed voltage level of the analog image signal, while reference VK denotes a voltage level of the superimposed signal. As seen from FIG. 16E, the superimposed signal VK remains in voltage level V0 when the focus displacement data are "0" (when the light quantity data DA coincide with the focus light quantity data Dmax). When the focus displacement data have certain values, the superimposed signal VK has high voltage levels corresponding to sums of voltage level V0 and the amounts of focus displacement.

The driver circuit 47 drives the AOM 32 in accordance with the voltage levels of the superimposed signal, such that the AOM 32 emits a light beam having an amplitude (energy level) variable with the amounts of focus displacement. Consequently, when focus displacement occurs with the light beam in certain areas in the primary scanning direction, the energy levels of the light beam are raised to record images with a fixed print line width over an entire range in the primary scanning direction.

This aspect will be described further with reference to FIG. 17.

Figure 17A:
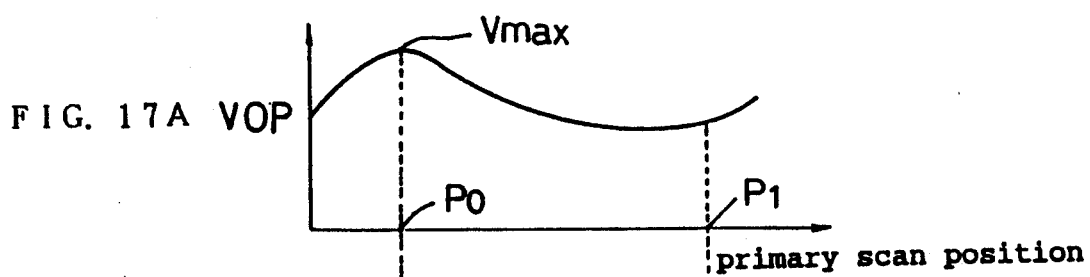
FIGS. 17A through 17D are views showing relations between light quantity of a light beam (energy level) and print line width.
Figure 17B:
Figure 17C:
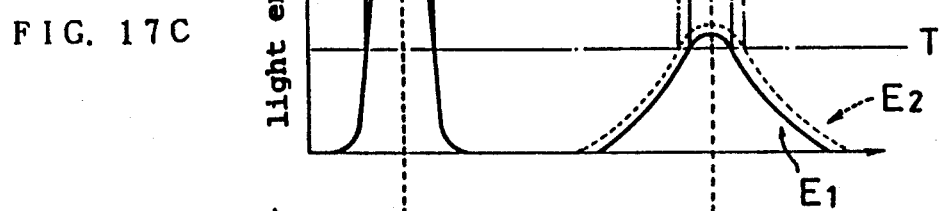

FIG. 17A shows one example of a waveform of the light quantity data DA. At a primary scan position P0 expressed by a pulse count of the grating clock GCL, the output voltage VOP of the corresponding photodiode 17 is at its maximum Vmax, that is the light beam has the focus light quantity. FIG. 17C shows a distribution of light energy E0 of the light beam occurring on the scanning plane (on the photosensitive sheet 1) at this time. Reference T in FIG. 17C denotes a threshold level of recording energy on the photosensitive sheet 1. Images are recorded when the light energy exceeds the threshold level T. Consequently, when the light beam is focused, the print line has a width d0 (FIG. 17B) corresponding to distribution ranges of the light energy exceeding the threshold level T.

At a primary scan position P1, on the other hand, the output voltage VOP of the corresponding photodiode 17 is less than its maximum Vmax, that is the light beam is not focused. At this time, the energy of the light beam has a distribution E1 on the photosensitive sheet 1, which flares downward as shown in FIG. 17C. As a result, the print line has a width d1 (FIG. 17B) corresponding to distribution ranges of the light energy exceeding the threshold T. Thus, the print line width is smaller when the light beam is out of focus than when the light beam is in focus.

Figure 17D:
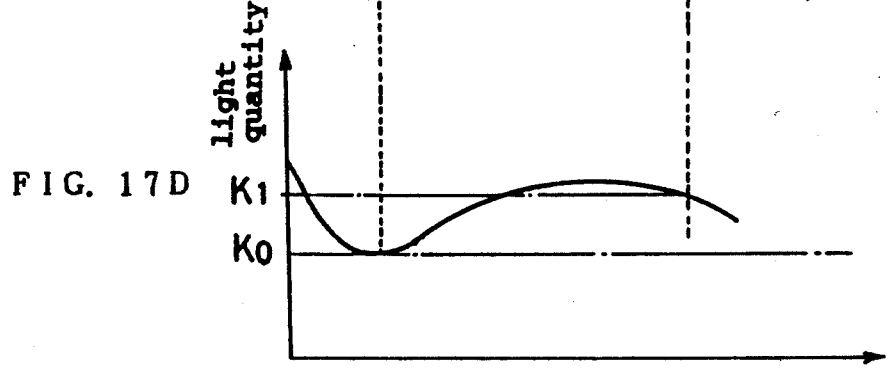

When the light quantity data as shown in FIG. 17A are converted into the inverse characteristic data noted above, and the light beam is amplified and modulated with these inverse characteristic data, the light beam quantity varies in the primary scanning direction as shown in FIG. 17D. At the primary scan position P0 where the light beam is focused, the light quantity remains unchanged as at K0, with the print line width d0 also remaining the same. However, at the primary scan position P1 where the light beam is not focused, the quantity of light increases from K0 to K1, with the light energy intensified accordingly. As a result, the distribution ranges of the light energy exceeding the threshold level T expand to increase the print line width from d1 to d0, which corresponds to the print line width provided by the focus light quantity.

The present invention may be embodied in other specific forms without departing from the spirit or essential attributes thereof and, accordingly, reference should be made to the appended claims, rather than to the foregoing specification, as indicating the scope of the invention.

What is claimed is:

1. A light beam scanning system for scanning an object with a light beam emitted from a light source, said light beam scanning system comprising:
   scanning means for scanning the light beam emitted from the light source;
   a lattice plate disposed in a position equivalent to a scanning plane of the light beam and extending in a primary scanning direction to receive the light beam from the scanning means, said lattice plate including a plurality of light transmitting sections each having a width substantially corresponding to a diameter of the light beam in an in-focus position;
   light quantity detecting means for detecting a light quantity of the light beam having passed through said light transmitting sections; and
   focus displacement determining means for determining amounts of focus displacement of the light beam at different points in the primary scanning direction from levels of a detection signal provided by said light quantity detecting means.

2. A light beam scanning system as defined in claim 1, wherein said lattice plate is grating glass plate defining slit-like light transmitting sections each having a width substantially corresponding to the diameter of the light beam in an in-focus position, and light shielding sections arranged alternately with said light transmitting sections, said light shielding sections for shielding a part f said light beam when said light beam diameter is larger than said width corresponding to the diameter of the light beam in an in-focus position.

3. A light beam scanning system as defined in claim 2, wherein said light quantity detecting means includes a plurality of photodiodes arranged along a side opposite a light beam impinging side of said grating glass plate.

4. A light beam scanning system as defined in claim 1, further comprising a branching optical element for branching the light beam to travel in two directions, one part of the light beam scanning an actual scanning plane, and the other part of the light beam scanning a virtual scanning plane optically equivalent to the actual scanning plane, wherein said lattice plate is set to said virtual scanning plane.

5. A light beam scanning system as defined in claim 1, wherein said lattice plate is set in a position flush with said scanning plane scanned by the light beam.

6. A light beam scanning system as defined in claim 1, wherein said focus displacement determining means includes:
   pulse generating means responsive to a detection signal outputted from said focus displacement determining means for generating clock pulses corresponding to incidence timing of the light beam with respect to said light transmitting sections;
   sampling means responsive to timing of said clock pulses for sampling the detection signal of said light quantity detecting means;
   analog-to-digital converting means for converting sampled levels of the detection signal into digital signals corresponding to light quantity data;
   pulse counting means for counting the clock pulses outputted from said pulse generating means;
   light quantity storage means for storing the light quantity data from said analog-to-digital converting means at storage addresses corresponding to counts provided by said pulse counting means;
   light quantity data converting means for converting the light quantity data successively read from said light quantity data storage means into amounts of focus displacement corresponding to the light quantity data; and
   output means for outputting the amounts of focus displacement provided by said light quantity converting means.

7. A light beam scanning system as defined in claim 1, further comprising light quantity adjusting means responsive to the amounts of focus displacement determined by said focus displacement determining means for adjusting the light quantity of the light beam to equalize print line widths at the different points in the primary scanning direction.

8. A light beam scanning system as defined in claim 7, wherein said light quantity adjusting means includes:
   focus displacement data storage means for storing data corresponding to the amounts of focus displacement determined by said focus displacement determining means at addresses corresponding to the different points in the primary scanning direction;
   data reading means for reading the data corresponding to the amounts of focus displacement from said focus displacement data storage means synchronously with scanning of the light beam of the object to be scanned in the primary scanning direction;
   image signal modulating means for modulating levels of an image recording signal based on the data corresponding to the amounts of focus displacement read from said focus displacement data storage means; and
   light beam modulating means for modulating an energy level of the light beam based on output of said image signal modulating means.

* * * * *